UNITED STATES PATENT OFFICE.

STEPHEN STRUNZ, OF BIRMINGHAM, PENNSYLVANIA.

IMPROVEMENT IN THE MANUFACTURE OF ROSIN-SOAP.

Specification forming part of Letters Patent No. 23,510, dated April 5, 1859.

*To all whom it may concern:*

Be it known that I, STEPHEN STRUNZ, of the borough of Birmingham, in Allegheny county, and State of Pennsylvania, have invented a new and Improved Mode of Making Rosin-Soap Without Boiling; and I do hereby declare that the following is a full and exact description thereof.

The nature of my invention consists in compounding tallow or fat, rosin, caustic lye, and carbonated lye, or tallow or palm-oil, rosin, or slaked lime, water, and soda-ashes, in the proportion as hereinafter described, for the purpose of making hard rosin-soap without the boiling process.

To enable others skilled in the art to use my invention, I will proceed to describe the operation and mode of making soap by my improved process.

First, melt, say, one hundred pounds of tallow or fat with, say, two hundred pounds of rosin Warm this mass to 70° or 80° Reaumur, and add one hundred and fifty pounds pure cold caustic lye. Stir the mass well during the process, and when it is well combined, which will be accomplished in three or four minutes, add seventy-five pounds of carbonated lye, and the result will be a fine, hard, light yellow rosin-soap, the entire process of saponification occupying from five to seven minutes. Or the process and ingredients may be varied, as follows: Melt, say, one hundred pounds of tallow or palm-oil with two hundred pounds of rosin, and warm the mass to 70° or 80° Reaumur. Then slake thirty pounds of lime in one hundred and ninety pounds of water, and in this lime-milk dissolve eighty pounds of soda-ashes of the strength of 80°. Strain this mixture through a sieve into the melted fat and rosin, stirring the whole during the process, and in from five to seven minutes the result will be a fine, hard, yellow rosin-soap.

The advantages of my process for making rosin-soap over the ordinary modes are as follows: Soap can be made much cheaper and quicker, and the mode of preparation being more simple, it requires far less utensils, fixtures, &c. Owing to the excess of soda-ashes contained in the soap, it washes equally well in hard and soft water. By the use of lime in the second method the water of crystallization is so completely taken up in the soap that, unlike any other rosin-soap, it loses almost nothing in weight by drying.

The objections heretofore made to soaps made without boiling (that they were deficient in hardness and were either wanting in strength or too caustic) are all obviated by my process.

The specimens of soap sent with this application for Letters Patent were made in the exact proportions above designated.

What I claim as of my invention, and desire to secure by Letters Patent of the United States, is—

The admixture, compounding, and preparing of the ingredients named, in the proportions herein specified and for the purpose set forth.

STEPHEN STRUNZ.

Witnesses:
 J. LUDEWIG RUETHEN,
 AND. M. MASTER.